Patented Apr. 26, 1949

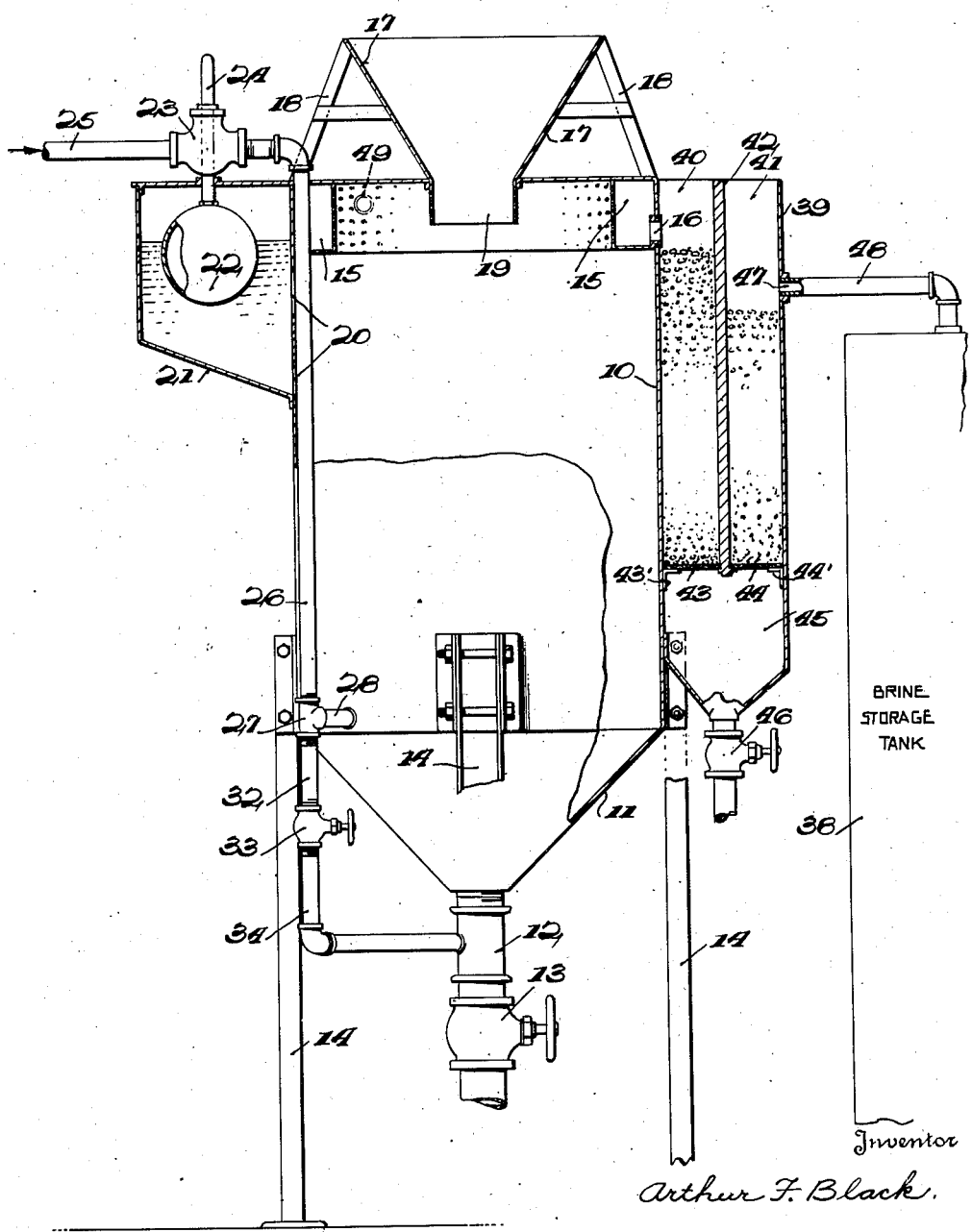

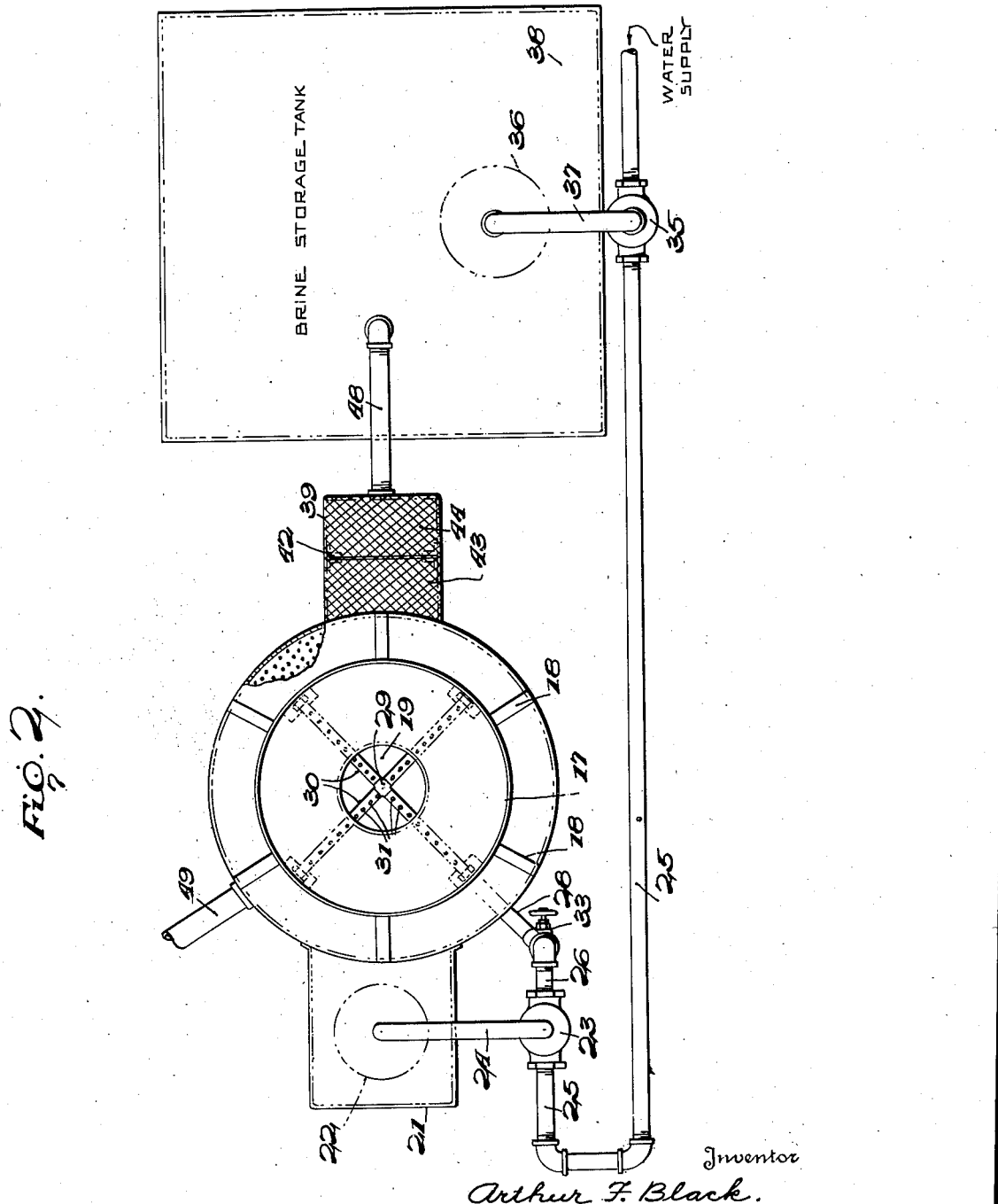

2,468,162

UNITED STATES PATENT OFFICE 2,468,162

APPARATUS FOR DISSOLVING SOLUBLE SOLIDS

Arthur F. Black, Charlotte, N. C., assignor, by mesne assignments, to Jefferson Island Salt Company, Louisville, Ky., a corporation of Delaware Application August 12, 1946, Serial No. 689,920

1 Claim. (Cl. 23—267)

This invention relates to salt dissolvers and more particularly to salt dissolvers for the making of brine solutions from rock salt.

Rock salt mined in certain sections of the United States is the purest mined and contains only a fractional percentage of insolubles, usually calcium sulfate. These insolubles are objectionable in most industries using salt solutions. It has been found that salt solutions can be made more cheaply from rock salt than from evaporated salt by the industries using it, provided the undesirable insolubles can be cheaply and efficiently removed from the solutions made from the rock salt. Most industries that use brine solutions require saturated solutions of the same at constant rates of flow.

Heretofore various salt dissolvers have been proposed, such as those shown and described in Black Patent No. 2,280,466 and Drake Patent No. 2,395,258. The dissolver of the present invention is a novel one with manifest advantages over these dissolvers, as will more fully appear hereinafter.

It is accordingly an object of this invention to provide a salt dissolver primarily for use in forming saturated brine solutions from rock salt which will remove undesirable insolubles from the solution.

Another object is to provide such a dissolver which will deliver saturated solutions free of undesirable insolubles at constant rates of flow.

Another object is to provide a dissolver which may be readily, quickly and efficiently cleaned so that interruptions to the flow of brine may be kept to a minimum.

Another and still further object is to provide a dissolver which is of simple and inexpensive construction and which may be installed and used by brine using industries without specially trained personnel.

Other and further objects will appear as the description of the invention proceeds.

One embodiment of the present invention is shown in the accompanying drawings and is described hereinafter for the purposes of illustration. This should in no way be construed as defining the scope of this invention and for this purpose reference should be made to the appended claims.

In these drawings, in which like reference characters designate similar parts, Fig. 1 is a view partly in section of an embodiment of this invention; and Fig. 2 is a top view of the device shown in Fig. 1, with the filtering material not shown in the filtering chambers to more clearly show the structure.

Referring to these drawings, 10 is a suitable salt dissolving tank here shown as of cylindrical shape and provided with a conical bottom 11. Secured to bottom 11 is drainpipe 12 closed by a suitable valve 13. Tank 10 is suitably supported as by legs 14.

Mounted within and adjacent the top of tank 10 is gutter member 15 having perforated inner and bottom walls. An opening 16 adjacent the top of tank 10 leads from gutter 15 for purposes that will be more fully described hereinafter.

A salt hopper 17 supported by legs 18 is mounted on the top of tank 10 and is so designed that its lower orifice 19 is medially disposed with respect to gutter 15.

Tank 10 is also provided with openings 20 leading to a float chamber 21, in which is mounted a float 22 operating a valve 23 through rod 24. Water is admitted to tank 10 through pipe 25 and passes through valve 23 and pipe 26 to a T 27, and thence through pipe 28, which in turn passes through the wall of tank 10 to a junction member 29. Member 29 distributes the water to radially disposed pipes 30 which are suitably perforated along their lengths as at 31.

Pipe 32 leads from T 27 to valve 33 which is normally closed and is in turn connected by pipe 34 to drain 12.

Inlet pipe 25 may be provided with a float controlled valve 35 actuated by a float 36 and connecting rod 37 mounted in a suitable brine storage tank 38 (Fig. 2).

Mounted on tank 10 is filter housing 39 divided into two filter chambers 40 and 41 by a medial wall 42. Wall 42 terminates short of the bottom of the housing 39 to form in conjunction with screens 43 and 44 a sump or settling chamber 45. Screws 43 and 44 are removably supported by medial wall 42 and brackets 43' and 44'. Chamber 45 is provided with a drain valve 46.

Filter housing 39 is so disposed with respect to tank 10 that opening 16 is adjacent the top of chamber 40. An opening 47 is let into housing 39 below opening 16 to connect chamber 41 through pipe 48 with the storage tank 38.

Suitable filter material, such as sand or gravel which may be of graduated particle size, is placed in chambers 40 and 41 and extends in chamber 40 from screen 43 to just below opening 16 and extends in chamber 41 from screen 44 to just below opening 47. I have found that optimum filtering results are obtained when the filter material in chamber 40 is of coarse particle size than that in chamber 41.

Tank 10 may be provided with a suitable overflow pipe 49 leading from adjacent the top of gutter 15 and disposed above opening 16.

When salt solution is required rock salt is loaded into hopper 17 and water admitted to pipe 26. As the rock salt passes downwardly in tank 10, it is dissolved by the counter flowing water from pipes 30 and is dissolved. By the time the solution enters gutter 15 and passes through opening 16, it is in supersaturated condition with impurities including calcium sulfate contained therein. This brine at 60° F. usually tests 101°–102° salometer or 1.206 to 1.210 specific gravity, as opposed to the fully saturated solution at this temperature testing 100° salometer or 1.204 specific gravity. The brine passes through opening 16 and down through the filter material in chamber 40 and through screen 43 into sump 45. The excess salt and insolubles cling to and crystallize on this filter material and the insolubles further adhere to this crystallized salt deposit so that when the brine enters sump 45 it is largely free of the salt particles and insolubles that were held in suspension. From sump 45 the brine passes upwardly through screen 44 and through the finer filter material in chamber 41 where whatever remaining salt particles and insolubles in suspension in the brine are removed before the fully saturated brine free of insolubles passes to storage tank 38.

From time to time the brine passing through chambers 40 and 41 will dislodge the salt and insolubles adhering to the filter material and these crystalline particles will collect in the sump 45 where they may be easily removed by opening valve 46. Further the filter chambers 40 and 41 and the filter material therein may be readily and quickly cleaned by flushing out with water through valve 46.

Tank 10 may be efficiently and easily cleaned by opening valve 13 and valve 33. The ensuing flushing action will wash all salt out of tank 10.

When the demand for brine is less than the rate of supply, storage tank 38 will fill and float 36 will rise, closing valve 35, shutting off the supply of water to tank 10, and the formation of the brine solution ceases until the demand lowers the supply in storage tank 38 and valve 35 is again opened.

If for any reason valve 35 does not operate or if the rate of flow through filter chambers 40 and 41 is retarded so that the level of the solution in tank 10 rises above the height of opening 16, then the height of the solution in float chamber 21 is raised and float 22 is actuated to close valve 23 and shut off the water supply. Overflow pipe 49 is provided to protect the device in case of failure of valve 23.

It will now be apparent that by the present invention I have provided a novel salt dissolver for forming saturated salt solutions from rock salt in which undesirable insoluble impurities and salt in suspension are efficiently removed from the brine; in which the saturated salt solution is delivered at uniform rates of flow; which may be easily, quickly and efficiently cleaned with minimum interruption to the flow of brine; and which may be installed and used by industries without specially trained personnel.

Changes to or modifications of the device described above may now be suggested to those skilled in the art without departing from the concept of my invention. Reference should be had to the appended claim to determine the scope of my inventive concept.

What is claimed is:

In a dissolver of the class described, a dissolving tank, a hopper at the top of said tank, perforated radially disposed pipes adjacent the bottom of said tank for introducing water into said tank, a conduit supplying water to said radially disposed pipes, a float control valve in said conduit responsive to the height of the solution in said tank, a normally closed flushing valve in the bottom of said tank, a line leading from said conduit to above said flushing valve, a normally closed valve in said line, a gutter adjacent the top of said tank, a filter housing secured to the outside of said tank, a partition in said filter housing and terminating short of the bottom of said filter housing, two vertically disposed filter chambers formed in said housing, a settling chamber formed in said housing beneath said filter chambers, an opening in the wall of said tank adjacent and above the bottom of said gutter and opening into one of said filter chambers, screens closing the bottoms of said filter chambers above said settling chamber to support filtering medium in said chambers, a solution storage tank, and a pipe leading to said storage tank and opening into the other of said filter chambers.

ARTHUR F. BLACK.

REFERENCES CITED

The following references are of record in the file of this patent:

UNITED STATES PATENTS

| Number | Name | Date |
|---|---|---|
| 577,068 | Quinn | Feb. 16, 1897 |
| 2,280,466 | Black | Apr. 21, 1942 |
| 2,395,258 | Drake | Feb. 19, 1946 |